UNITED STATES PATENT OFFICE.

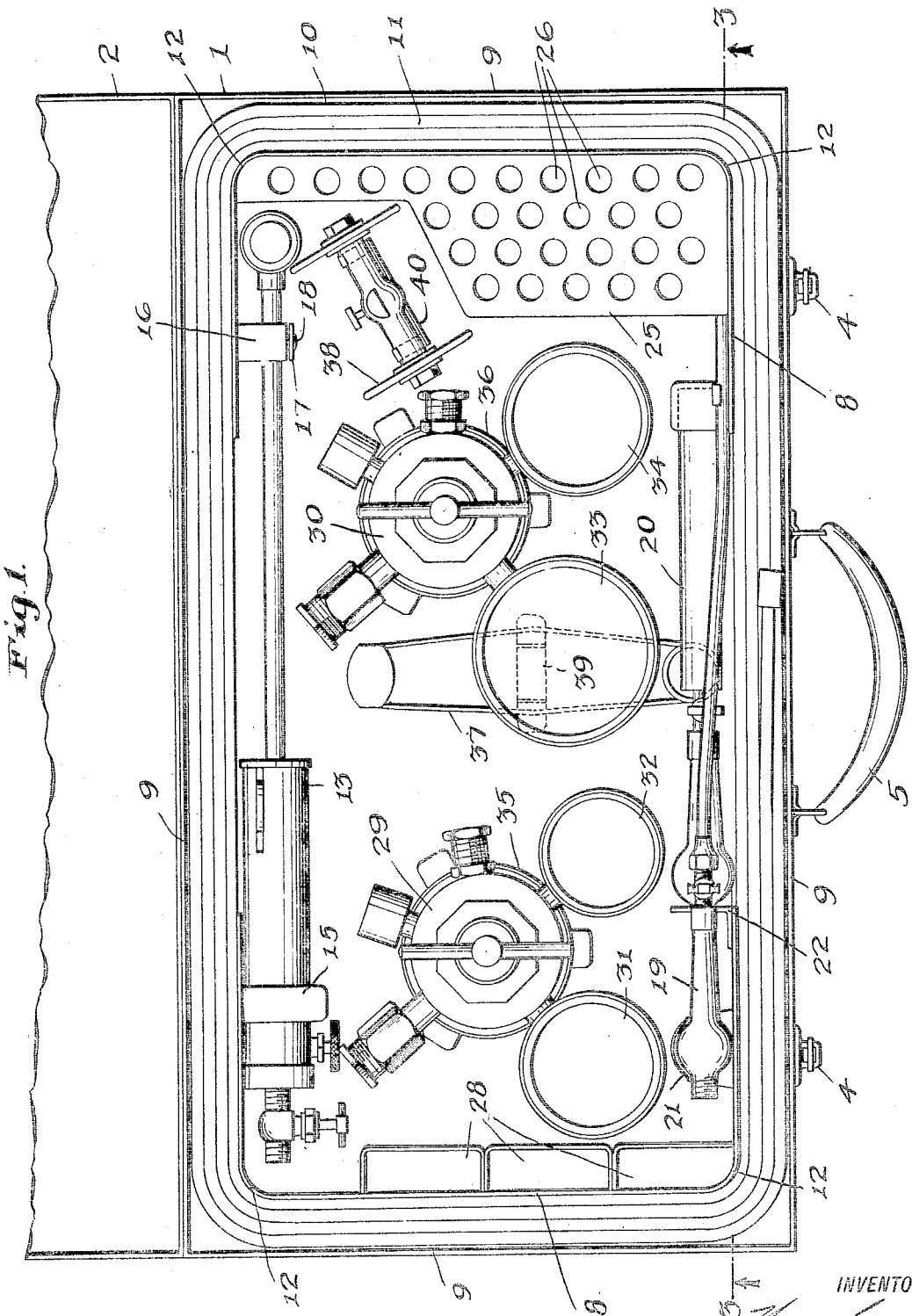

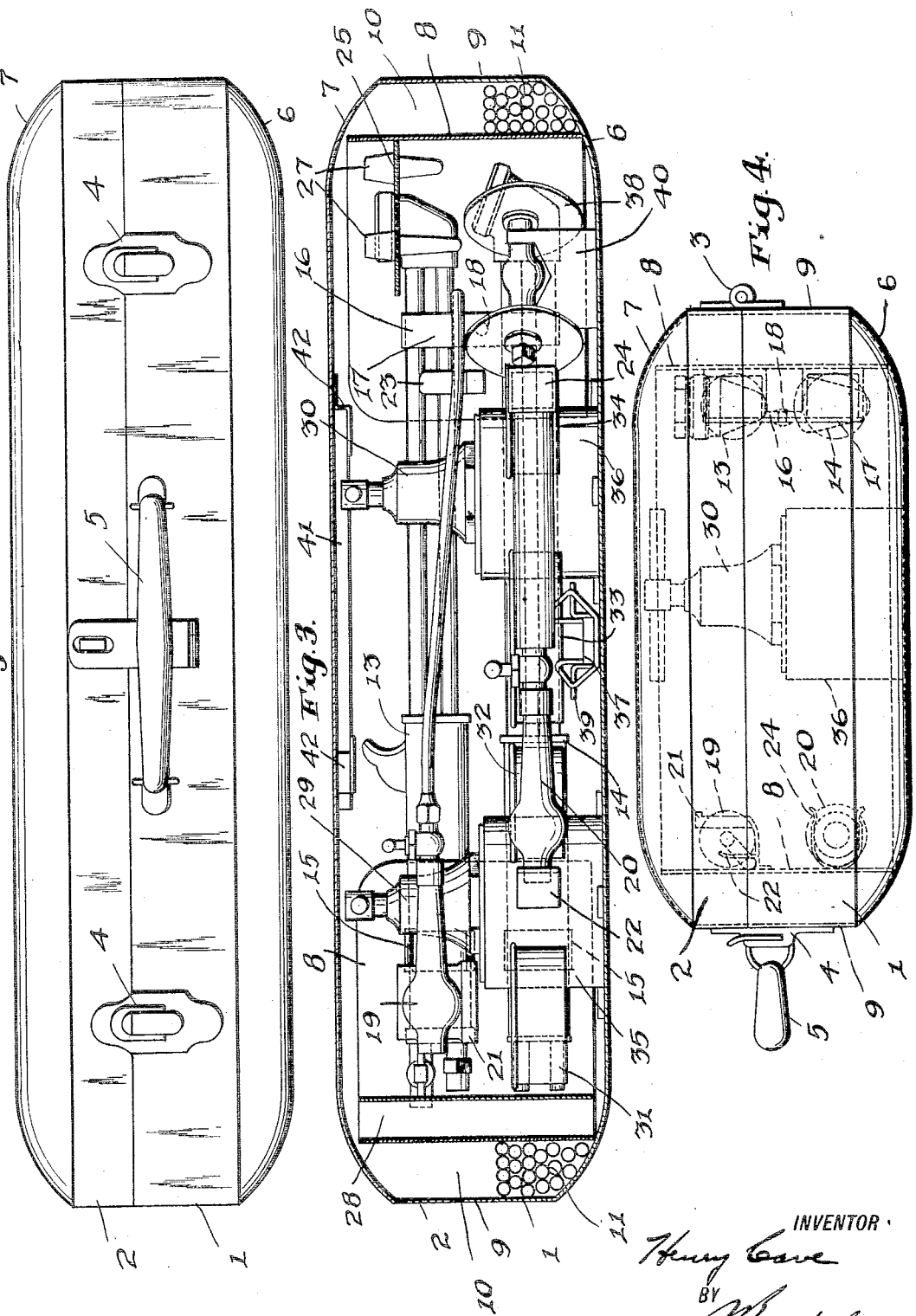

HENRY CAVE, OF ELIZABETH, NEW JERSEY, ASSIGNOR TO DAVIS-BOURNONVILLE COMPANY, OF NEW YORK, N. Y., A CORPORATION OF NEW YORK.

CARRYING-CASE FOR WELDING AND CUTTING EQUIPMENT.

1,309,273.   Specification of Letters Patent.   Patented July 8, 1919.

Application filed April 27, 1918. Serial No. 231,185.

*To all whom it may concern:*

Be it known that I, HENRY CAVE, a citizen of the United States, and resident of Elizabeth, in the county of Union and State of New Jersey, have invented a new and useful Carrying-Case for Welding and Cutting Equipment, of which the following is a specification.

The object of this invention is to provide means for carrying oxy-acetylene welding and cutting equipment and the like, which shall be compact and easily portable by hand, and wherein the articles of equipment shall be conveniently and safely disposed. The device comprises a carrying case of suitcase form, having inner walls rising from the bottom of the body section and dividing the interior into an ample space containing holders for torches, regulators, etc., and an encircling channel wherein the hose for connecting up the torches and regulators are wound.

In the drawings:

Figure 1 is a plan view of the case opened, with the lid section broken away;

Fig. 2 is a side elevation of the case closed;

Fig. 3 is a longitudinal section; and

Fig. 4 is an end view.

The case comprises tray-like sections 1 and 2, connected by a hinge 3 at one pair of long narrow sides and provided at the opposite sides with fastenings 4, the deeper or body section 1 being further provided opposite the hinge with a handle 5, the whole constituting a carrying receptacle of suitcase form. For greater strength the bottom and top walls 6 and 7 may be rounded at the edges, as shown.

Inner walls 8 are united by welding or otherwise to the bottom wall 6 of the body section, from which they rise above this section into proximity to the top wall 7 of the lid section 2, when the latter is closed. The said walls are located adjacent and parallel with the side walls 9 of the case, whereby an endless channel 10 of substantial length is produced wherein to wind the hose 11. To avoid injury to the hose, the corners 12 of the inner walls are rounded.

In the large space which is partly or completely inclosed by the walls 8 are holders of various characters for numerous articles of equipment. First among these are the torches. These include an oxy-acetylene or equivalent cutting torch 13 and an oxy-acetylene or equivalent welding torch 14. These two torches are placed longitudinally, one above the other, in holders 15 and 16, which are secured to the inner side of one of the long members of the inner walls 8. The holders 15 which receive the rear or handle portions of the torches may be in the nature of spring clips. The holders 16 for the forward parts are preferably formed by bending a strip to present three alternately reversed open rectangles, of which those at top and bottom face inward and are adapted to be closed by a bar 17 pivoted at 18 to the base of the central rectangle, so that the bar can be swung horizontally to permit removal of the torches. The portion of the wall 8 between the holders 15 and 16 is omitted, both for economy of material and weight and to facilitate the insertion and removal of the torches.

Supported upon the opposite long inner wall are a decarbonizing torch 19 and a Bunsen burner 20, having suitable forward and rearward holders 21, 22 and 23, 24, respectively, secured to the inner face of the wall. This wall is also interrupted like the other.

A shelf 25 projecting inward from one of the short inner walls 8 and formed with numerous perforations 26 holds torch-tips 27 of various sizes. Pockets 28 upon the inside of the opposite end wall may be used for goggles and other articles.

The large interior space accommodates two pressure-regulators 29 and 30, one for acetylene and the other for oxygen, each provided with high and low pressure gages 31, 32 and 33, 34, respectively. In use, as those familiar with the art are aware, these regulators screw onto the outlets of the gas supply tanks, and are connected with the torches by the hose 11. The regulators when in the case are confined in cups 35, 36, which are secured to the bottom wall 6. A gas lighter 37 and a torch guide-roll 38 are also mounted in suitable holders 39 and 40 upon the said bottom wall within the inclosure of the walls 8.

Wrenches 41 for screwing and unscrewing the torch tips and for making the various connections are retained in appropriate holders 42 on the inside of the top wall 7.

What I claim as new is:

1. A carrying case for oxy-acetylene and like equipment, the same being of suit-case form, and having walls rising from the bottom of the body section and inclosing an oblong interior space containing holders for torches and other articles of equipment, said walls being adjacent the side walls of the case from which they are spaced by an encircling channel adapted to receive hose.

2. Means for carrying oxy-acetylene and like equipment, comprising the combination of a carrying case of suit-case form, walls rising from the bottom of the body section adjacent the side walls of the case from which they are spaced by an encircling channel adapted to receive hose, torch holders upon the inner sides of the long interior walls, a perforated shelf for torch-tips projecting inward from one of the short interior walls, and holders upon the bottom of the oblong interior space for regulators.

3. Means for carrying oxy-acetylene and like equipment, comprising the combination of a carrying case of suit-case form, walls rising from the bottom of the body section adjacent the side walls of the case from which they are spaced by an encircling channel adapted to receive hose, and holders in the oblong space inclosed by said walls for various articles of equipment including holders at the inner sides of the long interior walls adapted to receive the forward and rearward portions of torches, the intermediate portions of said walls being omitted.

HENRY CAVE.